United States Patent [19]

Kim et al.

[11] 4,274,251

[45] Jun. 23, 1981

[54] YARN STRUCTURE HAVING MAIN FILAMENTS AND TIE FILAMENTS

[75] Inventors: Charles W. Kim, Wilmington; Chia-Seng Liu; Richard MacDuff, both of Newark, all of Del.

[73] Assignee: Hercules Incorporated, Wilmington, Del.

[21] Appl. No.: 951,801

[22] Filed: Oct. 16, 1978

Related U.S. Application Data

[62] Division of Ser. No. 896,547, Apr. 14, 1978, Pat. No. 4,186,781, which is a division of Ser. No. 750,982, Dec. 15, 1976, Pat. No. 4,101,358, which is a division of Ser. No. 590,664, Jun. 26, 1975, abandoned, which is a division of Ser. No. 324,028, Jan. 16, 1973, Pat. No. 3,922,329.

[51] Int. Cl.³ .................. D02G 3/22; D01D 5/42; D01D 5/253
[52] U.S. Cl. ........................ 57/206; 57/207; 57/248; 57/907; 428/397; 428/399
[58] Field of Search ............... 57/206, 207, 208, 907, 57/248; 428/397–400, 167, 369; 156/181, 167

[56] References Cited

U.S. PATENT DOCUMENTS

| | | | |
|---|---|---|---|
| 3,273,329 | 9/1966 | Scragg | 57/907 X |
| 3,470,594 | 10/1969 | Kim | 57/907 X |
| 3,500,627 | 3/1970 | Kim | 57/907 X |
| 3,503,199 | 3/1970 | Nesbitt-Dufort | 57/207 X |
| 3,503,836 | 3/1970 | Rasmussen | 57/907 X |
| 3,841,951 | 10/1974 | Kim | 156/181 |
| 3,864,903 | 2/1975 | Maki | 57/907 X |
| 3,874,969 | 4/1975 | Hureau et al. | 156/181 |

*Primary Examiner*—John Petrakes
*Attorney, Agent, or Firm*—Joshua W. Martin, III

[57] ABSTRACT

Methods of making network structures include forming on one side of a sheet of thermoplastic polymer a plurality of parallel continuous main ribs and forming on the other side of the sheet in a different direction a plurality of parallel discontinuous tie ribs. The tie ribs are discontinuous in the areas where they cross over the main ribs to eliminate any increased thickness at the cross-over points of the main ribs and tie ribs. The ribbed sheet thus formed is drawn in either one direction or in two preferably perpendicular directions to open the sheet into a network structure and to orient the main ribs and preferably also to orient the tie ribs.

3 Claims, 23 Drawing Figures

YARN STRUCTURE HAVING MAIN FILAMENTS AND TIE FILAMENTS

This is a division of application Ser. No. 896,547 filed Apr. 14, 1978, now U.S. Pat. No. 4,186,781, which is in turn a division of application Ser. No. 750,982, filed Dec. 15, 1976, now U.S. Pat. No. 4,101,358, which is in turn a division of Ser. No. 590,664, filed June 26, 1975, now abandoned, which is in turn a division of application Ser. No. 324,028, filed Jan. 16, 1973, now U.S. Pat. No. 3,922,329.

BACKGROUND OF THE INVENTION

This invention relates to new and improved network structures and methods for making such network structures, and particularly to network structures and methods for making them by embossing or forming continuous main ribs in one side of a thermoplastic polymeric sheet and discontinuous tie ribs on the other side of the sheet so as to permit spontaneous fibrillation or opening of the network structure upon drawing in one direction or in two preferably perpendicular directions and to provide a uniform open network structure having desirable strength characteristics.

In the manufacture of networks, it has previously been proposed to form continuous diagonal grooves in one direction in one side of a sheet of plastic material and continuous diagonal grooves in the opposite direction on the other side of the sheet so that upon subjecting the sheet to biaxial stretching the thin parts of the sheet, at the crossing points of the grooves, split and form perforations thereby opening the material into a network. For example, see U.S. Pat. No. 3,488,415 to A. G. Patchell et al. The networks therein disclosed are formed in such a manner as to have thicker masses at the points where the ridges cross, which behave as discrete areas of reinforcement, since on biaxial stretching or drawing of the embossed sheet the thick areas where the ridges cross orient only to a limited extent if at all. The tensile strength and tear characteristics of such a network are relatively poor because the presence of the unoriented thick areas weakens the tensile strength and tear resistance of the network so prepared, and such a network is not uniform in appearance. U.S. Pat. No. 3,500,627 to Charles W. Kim discloses making yarn by forming on one side of a ribbon of plastic material a plurality of parallel filament forming ribs and on the other side a plurality of fibril forming cross-ribs arranged at an acute angle to the filament forming ribs. The ribbon is then uniaxially oriented and mechanically fibrillated by means of a toothed fibrillating device to break the fibril forming ribs and form a yarn having fibrils extending laterally therefrom. Use of mechanical fibrillation makes reproducing uniform network structures very difficult.

SUMMARY OF THE INVENTION

The subject invention relates to network structures and methods of making network structures by forming on one side of a sheet of thermoplastic polymeric material in plurality of parallel continuous main ribs interconnected by webs of reduced thickness, and forming on the other side of the sheet a plurality of parallel discontinuous tie ribs interconnected by webs of induced thickness. By forming the tie ribs discontinuously to eliminate increasing the thickness of the main ribs at the cross-over points with the tie ribs, it is possible, among other things, to spontaneously open the ribbed sheet into a network by drawing, and to orient the main ribs continuously and uniformly, thereby making the main ribs very strong. It is this feature which provides a network structure having high tensile strength in the direction parallel to the main ribs. Additionally, by having continuous main ribs which are uniformly oriented, the tear strength in the direction across the main ribs is greatly enhanced.

After the main and tie ribs are formed in the plastic sheet the sheet is drawn in a direction to effect orientation of the main ribs continuously and uniformly, and may be drawn in two different, preferably perpendicular, directions to orient both the main and the tie ribs. For example, when the main ribs are formed in the machine direction and the tie ribs are formed in the cross-machine direction a network structure may be formed with only one draw, in this instance in the machine direction. Alternatively, a more open network structure can be formed by simultaneous or sequential drawing in both the machine and cross-machine directions. In sequential drawing of a sheet having main ribs in the machine direction, the first draw is customarily in the cross-machine direction. Upon drawing, the thinnest areas in the sheet namely the areas where the webs between the main ribs cross the webs between the tie ribs, become oriented and normally open up spontaneously, leaving a uniform pattern of holes or voids in the sheet. Under some conditions and levels of draw the web openings may not occur during the initial draw but may occur only during the subsequent perpendicular draw. In any event, the web openings occur spontaneously and thus there is no need for mechanical fibrillation. This spontaneous fibrillation or opening of the webs converts or forms the discontinuous tie ribs into tie filaments and the main ribs into main filaments. Hereinafter, the term tie ribs shall be used to refer to the tie ribs embossed on the sheet which are ordinarily interconnected by webs. After the webs split or open up, the tie ribs are separated and will be referred to as tie filaments. Likewise, the main ribs are referred to as main ribs while interconnected by webs, but after the webs split or open, the main ribs are separated and will be referred to as main filaments. These main filaments are continuous if in the machine direction, or if at an angle to the machine direction are continuous from one edge of the sheet to the other.

It has been found that highly desirable strength characteristics are obtainable in a network structure having main filaments in one direction crossed by discontinuous tie filaments in another direction so that all, or substantially all, of the orientation at the cross-over points of the main and tie filaments is applicable to the main filaments. The tie filaments if desired may be smaller in cross section than the main filaments and are usually oriented to provide sufficient structural integrity for the network structure, tending to keep it flat and prevent folding, thus maintaining the main filaments in parallel and uniformly spaced relation. The single layer plastic network structures thus formed are dimensionally stable, self-supporting, easy to handle, and have high tensile strength in the direction of the main filaments and high tear resistance in the other direction. Such nets are particularly useful for reinforcing paper products and nonwoven fabrics based on staple fibers and for covering absorbent pads.

Additionally, the network structures so formed may be made into multi-layer fabrics by bonding together two or more layers of network structures having the same or different configurations so that the main filaments cross in various directions to provide a multi-layered product having certain desired strength characteristics. For example, orthogonal constructions can be made wherein the main filaments of one layer cross at 90° to the main filaments of another layer to simulate the appearance and physical properties of woven fabrics and to provide high strength and tear resistance in two directions. Diagonal constructions, wherein the main filaments of the two layers cross preferably at about 90° to each other with the main filaments of both layers being at an angle to the machine direction of the fabric, possess stretch and recovery properties in the machine direction similar to those of knitted fabrics. Fabrics made from three or more layers of networks each having the main filaments in different directions have excellent dimentional stability, high strength and tear resistance in all directions and high burst strength. For example, triaxial constructions, wherein a diagonal construction is utilized having interposed between the two layers a network having main filaments formed in the machine direction, provide high bursting strength with minimum weight. Isometric constructions, wherein the main filaments of at least four layers are positioned at about 45° angles to each other, provide strength in all directions with dimensional stability heretofore unattainable in woven, knit or other nonwoven fabric structures with equivalent unit weight.

Additionally, the subject network structures which have main filaments in the machine direction can be made into monofilamen tapes or yarns by separating the network structure into strips which may be subsequently fibrillated, and twisted or bulked to entangle the main filaments of the strips. If desired, the strips may also by crimped or false twisted.

Other advantages of the present invention will be apparent from the following detailed description of the invention when considered in conjunction with the following detailed drawings, which drawings form a part of the specification. It is to be noted that the drawings illustrate only typical embodiments of the invention and are therefore not to be considered limiting of its scope, for the invention may admit to other equally effective embodiments.

DESCRIPTION OF THE INVENTION

Figure 1:
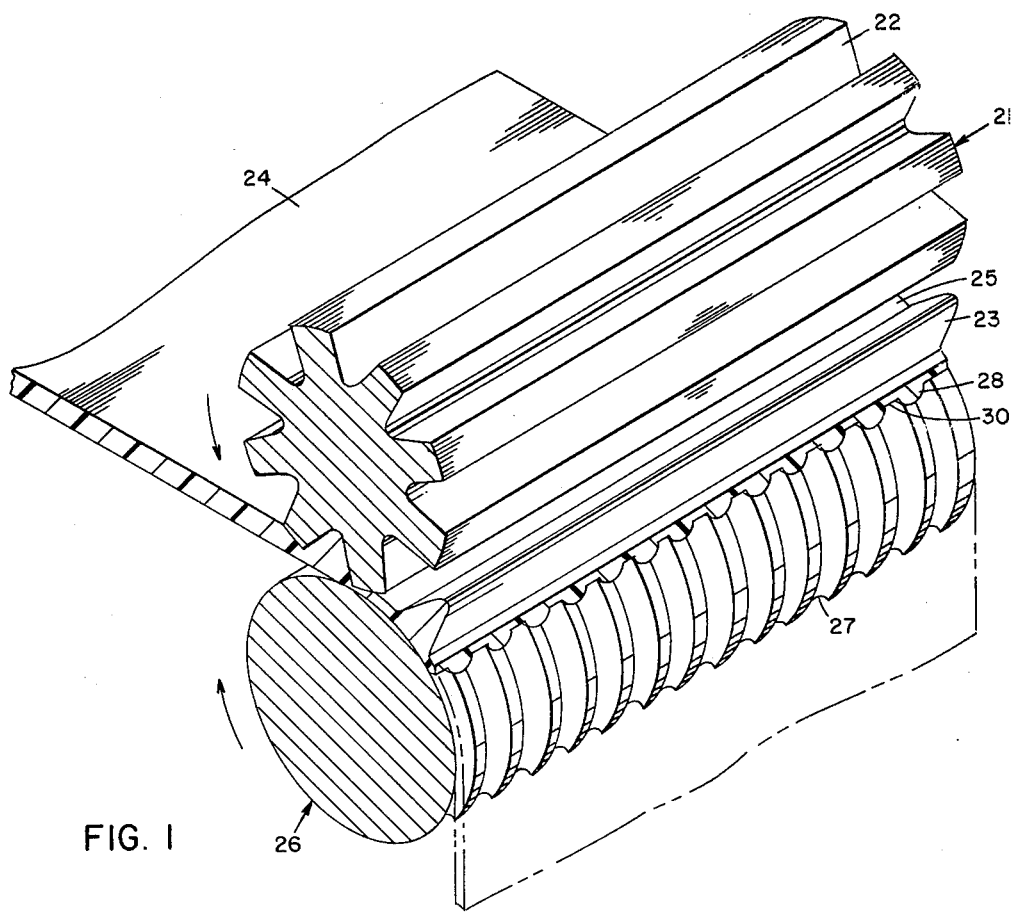
FIG. 1 is a perspective schematic view illustrating apparatus for embossing ribs on both sides of an advancing sheet of plastic material in accordance with the principles of this invention.
Figure 2:
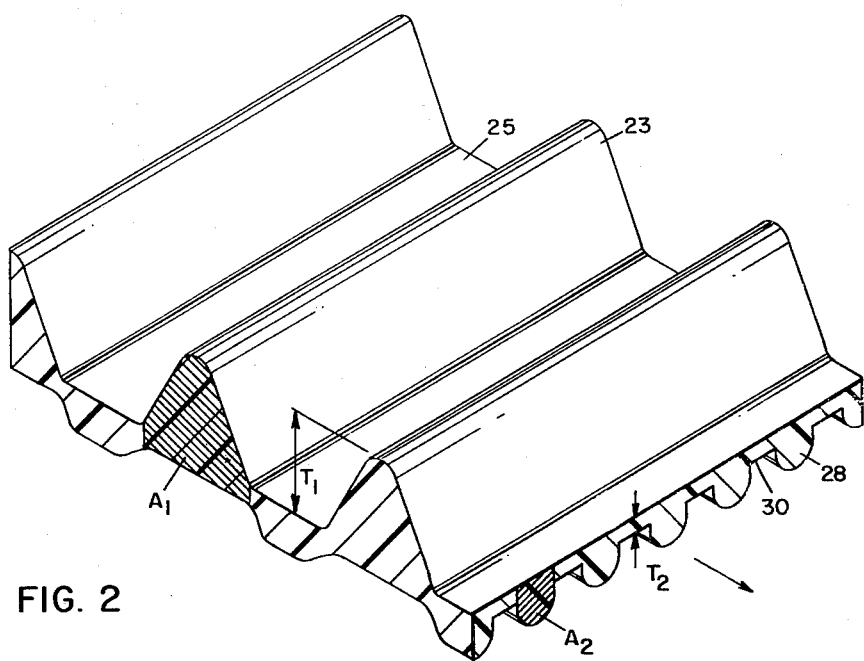
FIG. 2 is an enlarged perspective view of a portion of the embossed sheet shown in FIG. 1.

Referring now to FIGS. 1 and 2, there is shown an embossing roll 21 having a plurality of grooves 22 formed therein for forming a plurality of transverse main ribs 23 on an advancing sheet of thermoplastic polymer material 24 with the ribs 23 being interconnected by webs 25 of reduced thickness. Another embossing roll 26 having a plurality of annular or helical grooves 27 formed therein is positioned opposite roll 21 for forming a plurality of longitudinal tie ribs 28 on the other side of the sheet 24 with the tie ribs being interconnected by webs 30 of reduced thickness. The embossing rolls 21 and 26 rotate in the directions shown by the arrows. There are a variety of different ways to effect the double embossing described herein. One method is to feed a molten plastic sheet, such as 24, coming directly from an extrusion die into the nip of two counter-rotating embossing rolls, such as 21 and 26, which are urged toward each other by facilities which are not shown. The desired separation between the rolls and ultimately the thickness of the extruded sheet is readily controlled by regulating the thickness of the extruded sheet entering the embossing rolls and the pressure between the two embossing rolls. The roll temperatures typically are internally controlled and serve to quench and solidify the molten plastic forming the desired embossed patterns on each side.

Alternatively, a previously cast flat sheet or film may be re-heated to its softening temperature and then advanced through a pair of embossing rolls, such as 21 and 26. Another method may utilize a polymer which is in powder form and which is introduced into the nip between two heated rolls, not shown, to permit the heated rolls to melt and soften the polymer and form it into a sheet which is then advanced between two embossing rolls such as 21 and 26. An additional method is to pass a previously cast flat sheet or film between two embossing rolls pressed together under a sufficiently high pressure so that the embossed patterns are pressed into the sheet without having to melt or soften the sheet. It is evident that many embossing techniques may be utilized to carry out the principles of this invention.

It has been found that by making the tie ribs discontinuous where they cross over the main ribs a network structure can be made having uniformly spaced main filaments oriented uniformly and continuously along their lengths and being quite uniform in cross-section. The discontinuous tie rib configuration eliminates any thick areas where the main filaments and tie filaments cross which would cause those areas to remain either unoriented or only slightly oriented on drawing. While the size of the main ribs may be equal to the size of the tie ribs, it has been found desirable to make the main ribs larger than the tie ribs thereby permitting among other things, the main ribs to be drawn and oriented to a greater degree so that most of the strength of the network is attributed to the main ribs. In this instance, most of the polymer used in the network is in the main ribs and thus provides most of the structural strength, while the tie ribs provide structural integrity. It has been found that a desirable range of the ratio of the cross-sectional area of the main ribs to the cross-sectional area of the tie ribs is between 1.5:1 to 100:1, with the ratio of the height of the main ribs to the thickness of the webs between the main ribs being at least 3:1 or greater. Thus, as shown in FIG. 2, the cross-sectional area $A_1$ of the main ribs and the cross-sectional area $A_2$ of the tie ribs each includes the web area adjacent to the base of each respective rib. Also identified in FIG. 2 is the height $T_1$ of the main ribs and the thickness $T_2$ of the webs interconnecting the main ribs.

The cross-sectional shape of the ribs formed may vary. They may be semi-circular, rectangular, triangular, truncated, or any other desired shape. Furthermore, the shapes of the main and tie ribs may be the same or different. Likewise, the shape and size of the grooves separating the main or tie ribs is not critical. The grooves may be narrow so that the ribs are close together, or wide so that the ribs are more widely separated. Furthermore, the tie ribs may be spaced farther apart than the main ribs or vice versa. The size of the openings in the network structure may be controlled to some degree by controlling the spacing of the main and tie ribs.

Additionally, the direction of the main ribs is not critical. The main ribs may be formed in the machine direction of the sheet, or transverse to the machine direction, i.e., 90° thereto, or at any angle in between. With the main ribs formed in either the machine direction or the transverse direction, orienting the main ribs along their longitudinal axes is easily accomplished by use of either a conventional linear differential speed draw roll device or a conventional tenter. Likewise, if the embossed ribs are diagonal to the machine direction, orientatin of the ribs and not formation may be achieved using the same type of equipment. In orienting main ribs which are formed at an angle to the machine direction along their longitudinal axes. it is sometimes advantageous to utilize a long draw gap linear drawing unit so that upon drawing in the machine direction the sheet is permitted to neck down and cause orientation of the main ribs principally along their longitudinal axes. In drawing in such a manner, it is usually desirable that the linear draw be preceded by a cross-machine direction orientation by passing the sheet through a tenter.

The direction of the tie ribs on the reverse side of the sheet should be at an angle to that of the main ribs, which in many cases is desirably 90°, but can also be other angles. Any angle between about 15° and 90° between the directions of the main ribs to the tie ribs is acceptable.

Figure 3:
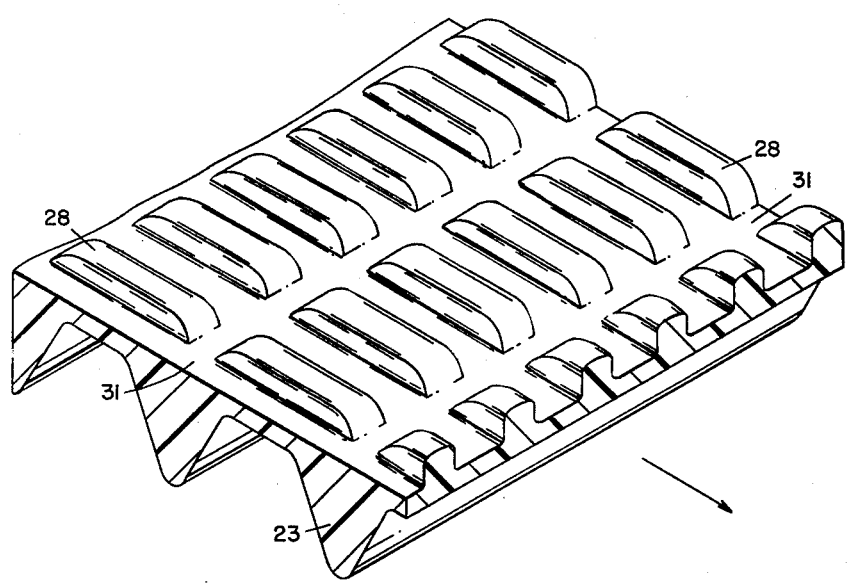
FIG. 3 is an enlarged perspective view of the tie rib side of the sheet in FIG. 2 illustrating the discontinuities in the tie ribs.

Referring to FIG. 3, there is shown the tie rib side of the embossed sheet shown in FIG. 2. Note that the tie ribs 28 are discontinuous at 31. The discontinuous tie ribs are formed by either controlled embossing to obtain a "cave-in" effect or by using a discontinuous tie rib embossing roll. FIG. 3 illustrates an embossed sheet having continuous main ribs 23 and discontinuous tie ribs 28 made under selected and controlled embossing conditions wherein on the tie rib side of the sheet there are cave-ins or discontinuities 31 in the tie ribs 28 where they cross the main ribs 23, thereby making the tie ribs 28 discontinuous.

In using grooved embossing rolls such as 21 and 26 shown on FIG. 1 it is possible to control the pattern resulting from contact with the main rib and tie rib rolls so as to obtain a "cave-in" effect at the cross-over points of the respective ribs resulting in discontinuous tie ribs. The factors contributing to this effect are the thickness of the sheet being embossed, the temperature of the polymer being embossed, the embossing roll temperatures, the position of first contact of the molten sheet with the embossing rolls, and the time of contact of the embossed sheet with one roll. Discontinuity development in the tie rib embossed pattern are accentuated by use of thin polymer sheets, by having the molten polymer relatively cool before touching the embossing rolls, by causing the sheet to contact one of the rolls, preferably the one with the larger grooves, for a short distance before entering the nip between the rolls, and by maintaining the embossed sheet in contact with one of the rolls, preferably the one with the larger groove pattern, for a distance after leaving the nip between the rolls. The degree of penetration of the polymer into the grooves of the roll with the finer pattern, and shrinkage of the polymer as it cools after being embossed in the nip between the rolls are undoubtedly factors contributing to the unique results of this method. Accordingly, by such controls, the pattern of the grooves 22 of main rib embossing roll 21 will cause formation of continuous ribs 23 on one side of the sheet, but the embossed tie ribs 28 will be made discontinuous as shown in FIG. 3. After orientation, this type of embossed pattern results in a strong and inexpensive network structure, among other reasons, because it causes a higher proportion of the polymer to be present in the main ribs than when employing other embossing conditions. Additionally, the discontinuous tie ribs 28 are further advantageous in that they permit the main ribs 23 to be completely and uniformly oriented since there is essentially no cross-over of the main ribs 23 and the tie ribs 28.

Figure 4:
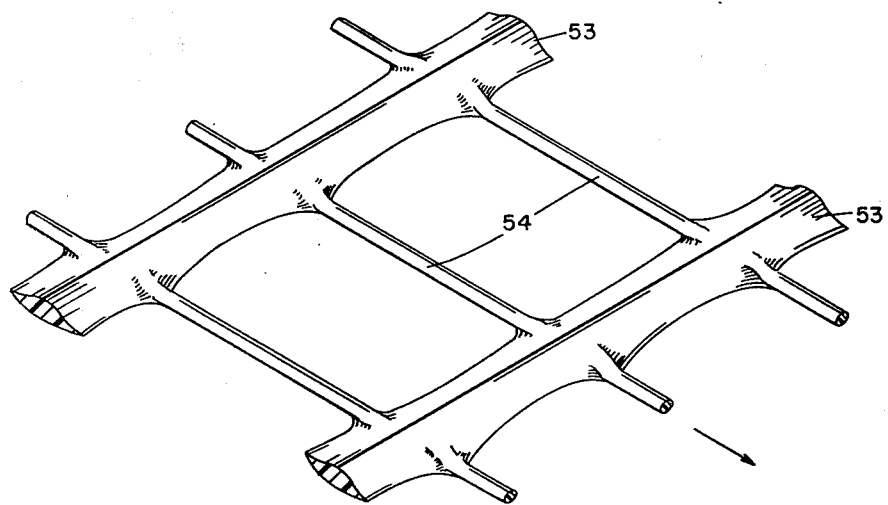
FIG. 4 is an enlarged perspective view of the network structure obtained after drawing and orienting the embossed sheet shown in FIGS. 2 and 3 in two directions.

When the embossed sheet having a first pattern of continuous main ribs on one side and a second pattern of discontinuous tie ribs on the other side is drawn, the thin areas of the sheet, namely the areas where webs 25 and 30 cross, spontaneously split, forming openings. After the second draw is completed, if desired, a network structure such as or similar to that shown in FIG. 4 is achieved. The main ribs 23 of the embossed sheet shown in FIGS. 1-3 have been separated into main filaments 53 which are oriented continuously and uniformly. The tie ribs 23 have also been separated and oriented into tie filaments 54 which interconnect the main filaments 53 and keep them uniformly spaced apart.

Figure 5:
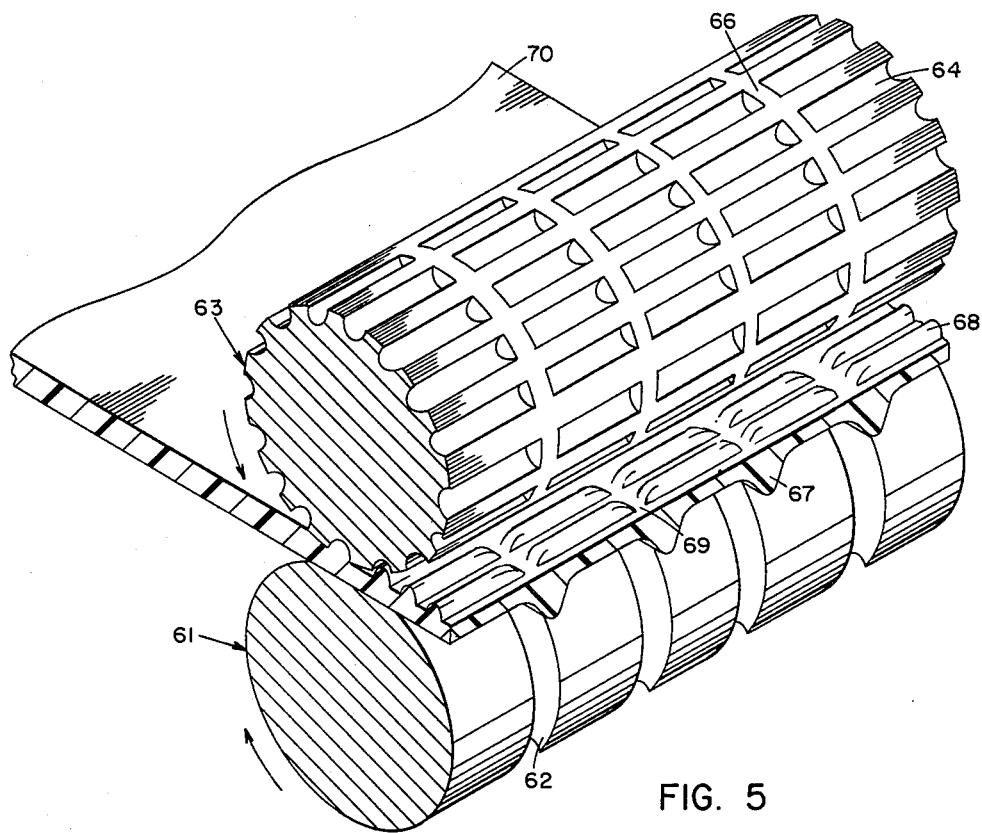
FIG. 5 is a perspective schematic view illustrating other apparatus for embossing continuous main ribs on one side of a sheet and discontinuous tie ribs on the other side of the sheet.
Figure 6:
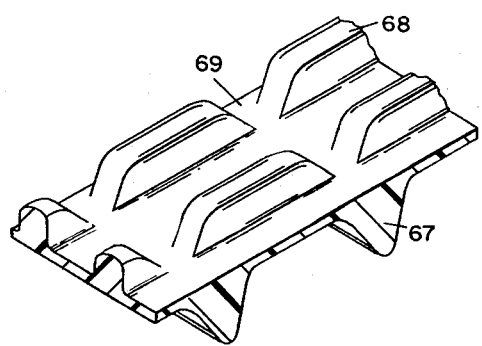
FIG. 6 is an enlarged perspective view of the tie rib side of the embossed sheet made in accordance with the principles of this invention.

Discontinuities in the tie rib embossing pattern can also be obtained in an alternate way, such as by using a continuous main rib embossing roll 61 and a discontinuous tie rib embossing roll 63 as shown in FIG. 5. The main rib embossing roll 61 has a plurality of parallel annular grooves 62 formed therein for forming main ribs 67 in a sheet 70. The tie rib embossing roll 63 has a plurality of discontinuous grooves or recesses 64 formed therein parallel to the longitudinal axis of the roll for forming discontinuous tie ribs 68. In each row of grooves 64 across the embossing roll 63, each groove or recess 64 is blocked from the adjoining recess by a blocking section 66 of the roll 63. Desirably, the width of the blocking section 66 is equal to or slightly less than the width of the groove 62 of the main rib embossing roll 61. It is to be noted that the tie ribs are not continuous across the embossed sheet, but rather are continuous only from one main rib 67 to the adjoining main rib having a discontinuity at area 69, as shown clearly in FIG. 6. Because of the configuration of the roll 63, little or no polymer is left on the tie rib side of the sheet directly opposite the main rib 67. By embossing a sheet 70 in this manner, and subsequently drawing in one or two directions, the main ribs can be highly oriented continuously and uniformly. Using embossing roll 63 in this manner assures that little or no polymer is formed across the main ribs 67. This allows for high orientation of the main ribs and optimizes the polymer distribution. In view of the fact that there is little or no mass of polymer crossing over the main ribs when using either the controlled embossing method described above to obtain the cave-in effect shown in FIG. 3, or the discontinuous tie rib forming method as described above and shown in FIG. 5, the ratio of cross-sectional areas of the main ribs to the tie ribs is not significant. Accordingly, equal size main and tie ribs will work satisfactorily, as well as different size main and tie ribs. However, to obtain low unit weights or finer network patterns, e.g., more square yards of net per ounce of polymers, it may be desirable to use a pattern having more and smaller tie ribs than main ribs. An advantage of the controlled embossing method using two embossing rolls having continuous grooves such as shown in FIG. 1, ever the discontinuous tie rib forming method using a special roll such as 63 having discontinuous grooves 64 as shown in FIG. 5, is that there is no need in the former to precisely and accurately register and align the embossing rolls as is required in using the FIG. 5 apparatus.

Figure 7:
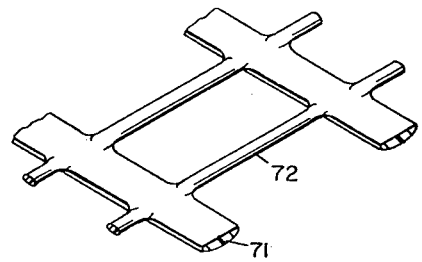
FIG. 7 shows one side of the network structure made after stretching in two directions the sheet shown in FIG. 5 or 6.

FIG. 7 shows a portion of a network structure formed after drawing the embossed sheet shown in FIG. 5 in both the cross-machine and the machine directions. Note that the main filaments 72 flatten out somewhat after drawing, and that the tie filaments 72 uniformly space the main filaments 71 apart. The tie filaments 72 have their ends integrally joined to the main filaments 71, and do not extend across the main filaments 71.

In drawing the embossed sheet, the preferred amount of draw would depend on such factors as the polymer employed, the embossing pattern employed, and the degree of separation of the main filaments desired in the final network structure. Customarily, the first drawing or orientation step involves drawing the embossed sheet in a direction generally transverse to the direction of the main ribs to cause orientation of the thinner areas of plastic material between the main ribs. Referring, for example, to the embossed sheet shown in FIG. 2, since the main ribs 23 are formed in the cross-machine direction, the first draw would normally be, but is not necessarily, in the machine direction. This draw could be effected by using conventional linear differential speed draw rolls. This orientation, which is usually 1.5X or greater, generally results in incipient or actual voids or openings being formed between the main ribs with the formation of small tie filaments spanning the openings between the main, as yet unoriented ribs or filaments.

As an alternative, it may be desirable to carry out an initial draw such as, for example, up to 2X, in the direction of the main ribs prior to the drawing step top transverse to this direction. This initially orients and strengthens the main ribs and tends to prevent any possible distortion or development of cross-orientation of the polymer in the cross-over areas during the transverse orientation.

The second orientation stop is normally carried out in a direction generally parallel to the main ribs. Thus, referring again to the embossed sheet shown in FIG. 2, the second orientation would be in the cross-machine direction. This transverse drawing step, could be carried out on a conventional tenter. The transverse draw causes oriention of the main ribs along their longitudinal axes and separation of the small, connecting tie filaments. The amount of draw will determine the strength and size of the resulting main filaments. It can vary from as low as 1.5X to 10X or greater. The maximum draw will depend on the orientation characteristics of the polymer employed, among other things. Temperatures for drawing will vary depending upon the polymer employed but generally will be slightly lower than these employed for orientation flat sheets of the same polymer. While reference has been made to first and second sequential drawing steps, both draws may be carried out simultaneously if desired.

Figure 9:
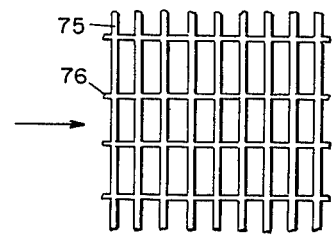
FIG. 9 is a plan view illustrating a portion of a network structure having main filaments in the cross-machine direction and tie filaments in the machine direction.
Figure 10:
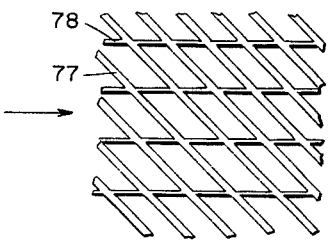
FIG. 10 is a plan view illustrating a portion of a network structure having main filaments formed at an angle to the machine direction with tie filaments formed in the machine direction.
Figure 11:
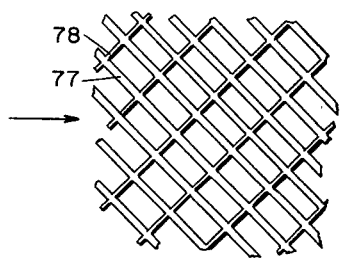
FIG. 11 is a plan view illustrating a portion of a network structure having main filaments formed at an angle to the machine direction with tie filaments formed perpendicular to the main filaments.

The network structures produced by the foregoing methods contain as desired longitudinal transverse or oblique oriented main filaments interconnected by normally lower denier, oriented tie filaments, with the main filaments having orientation continuously over their lengths. Examples of the different configuration of network structures that can be made are shown in FIGS. 8, 9, 10 and 11. In FIG. 3, a network structure is shown having main filaments 73 extending in the machine direction, the direction of the arrow, and tie filaments 74 being formed in the cross-machine direction 90° to the machine direction. In FIG. 9, the main filaments 75 are formed transverse to the machine direction, indicated by the arrow, and the tie filaments 76 are formed parallel to the machine direction. In FIG. 10, the main filaments 77 are formed at an angle to the machine direction, shown by the arrow, and the tie filaments 78 are formed parallel to the machine direction. Alternatively, the tie filaments may be formed in the cross-machine direction or they are perpendicular to the main filaments 77 such as shown by tie filaments 56 in FIG. 11. When the main filaments 78 are formed at an angle of 75° or less to the machine direction, in order to orient such filaments, it is sometimes desirable to draw in the machine direction while permitting necking down of the network structure. Ordinarily, in making this configuration, the cross-machine draw in a tenter, if desired, comes first, followed by the machine direction draw allowing neck-down. It is apparent that many other configurations of network structures may be made in accordance with the principles of this invention, having the main filaments at any desired angle wherein maximum tensile strength is desired and the tie filaments formed at an angle relative to the main filaments.

The network structures described herein have good tensile strength in the direction of the main filaments which reflects the degree and uniformity of orientation along the length of these filaments. This strength is lower in the opposite direction because of the smaller size of the interconnecting tie filaments. The tear strength is high in the direction transverse to the main filaments because of the strength of the main filaments. It is to be noted that the network structures such as shown in FIGS. 4 and 7 have tie filaments which are discontinuous and integrally join the main filaments, without there being notches at the junctures as is characteristic of many network structures prepared by previous methods. Such notches at the junctions or crossovers enable a network to tear easily in either direction.

Figure 12:
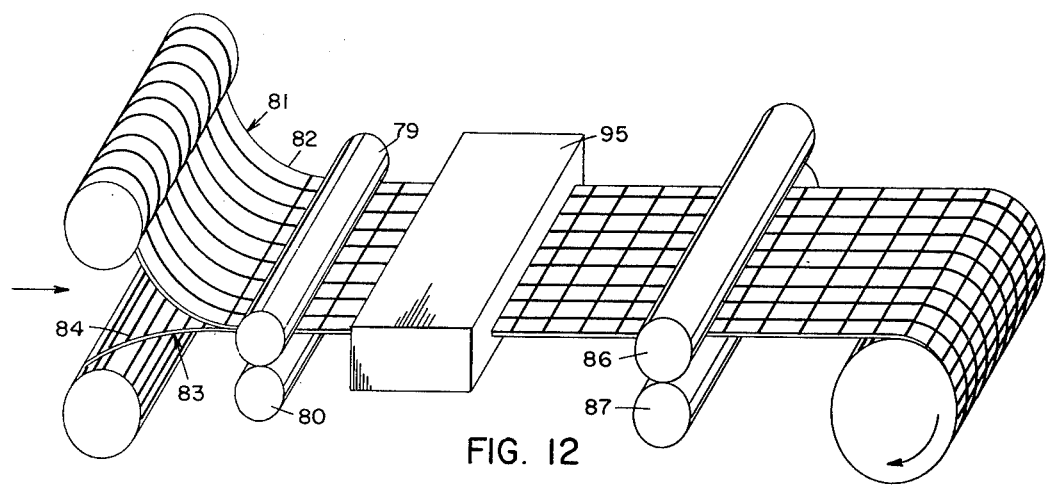
FIG. 12 is a perspective schematic view illustrating apparatus for making multi-layer fabric structures in accordance with the principles of the subject invention.

The subject network structures, while useful as single layer network structures, may also be employed to prepare very useful multi-layer fabric structures. Referring to FIG. 12, there is shown one network structure, generally designated as 81, having main filaments 82 formed in the machine direction and tie filaments, not shown, formed in the cross-machine direction being laminated or bonded to a second network structure, generally designated as 83, having main filaments 84 formed in the cross-machine direction. Tie filaments are not shown in any of the network structures shown in FIGS. 12-17 to facilitate illustration and description of the fabric structures. Nevertheless, the tie filaments are present in each network and may be assumed to be as shown in FIGS. 8-11 or as previously described. One way of bonding the two network structures 81 and 83 together is to pass them through rolls 70 and 80 into a preheater 95 to heat the networks under tension without adversely affecting the orientation thereof and then advance them into the nip of two heated calender rolls 86 and 87 to bond the plastic materials to each other. Rolls 79 and 80 rotate very slightly slower than rolls 86 and 87 to maintain the networks 81 and 83 under tension during heating to avoid loss of orientation. Likewise, it is desirable to use a tenter, a series of closely spaced rolls or other means to prevent lateral shrinkage of the networks in this area. This bonding or lamination process forms a two-layer fabric which has the appearance and physical properties of a woven fabric having high strength and good tear resistance in both the machine and cross-machine directions. Such a fabric has substantially no stretch in the machine and cross-machine directions, but does stretch on the bias.

Figure 13:
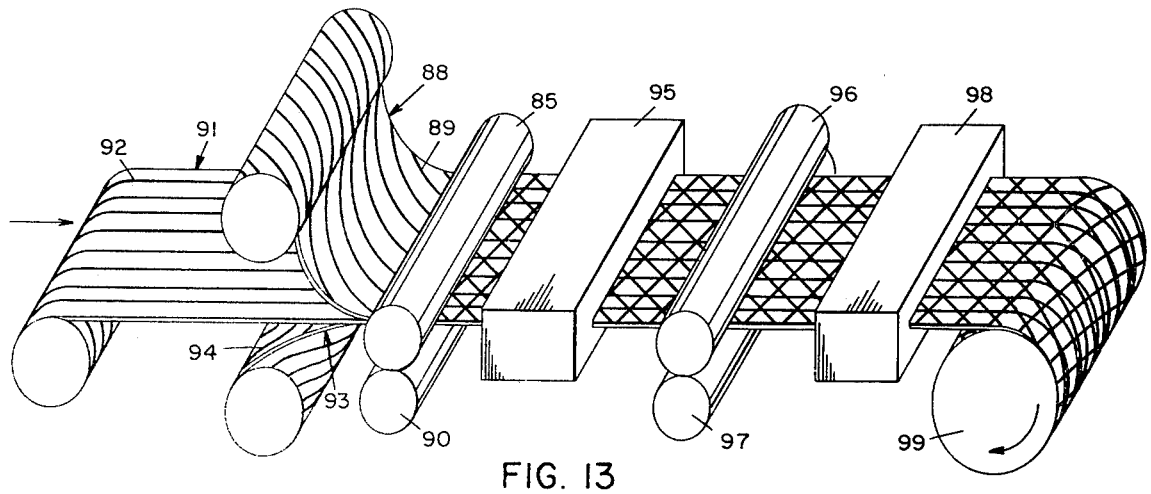
FIG. 13 is a perspective schematic view illustrating other apparatus for making multi-layer fabric structures in accordance with the principles of this invention.

Three or more layer fabrics can also be prepared with the main filaments of each being formed in different directions to provide fabrics having excellent dimensional stability, high strength in all directions and high burst strength. As shown in FIG. 13, a first layer or network structure, generally designated as 88, has main filaments 89 formed at an angle to the machine direction which is indicated by the arrow. A second central layer or network structure 91 has main filaments 92 formed in the machine direction. A third layer or network structure 93 has main filaments 94 formed at an acute angle to the machine direction opposite that of the angle of layer 88. The three layers pass through the nip of rolls 85 and 90, into a preheater 95 and through the nip of two heated calender rolls 96 and 97 which bonds the three layers together at their cross-over points. The bonded fabric may then pass through an annealing unit 98 and is taken up on take-up spool 99. If desired, a conventional tenter or other means could be used to maintain tension in the cross-machine direction during heating and bonding. Such three or more layer fabrics provide strength in all directions and dimensional stability unobtainable in woven, knitted or other nonwoven fabric structures with equivalent weight. Such fabrics provide good stretchability in the cross-machine direction.

Figure 14:
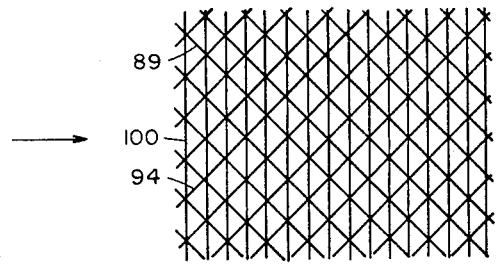
FIG. 14 is a plan view illustrating a portion of a three-layer triaxial fabric with one layer having main filaments formed in the cross-machine direction and the other two layers having their main filaments formed at equal opposite angles to the cross-machine direction main filaments.

Referring to FIG. 14, there is shown a similar three layer fabric, except that it has a central layer having its main filaments 100 in the cross-machine direction. Such a fabric has good stretchability in the machine direction.

Figure 15:
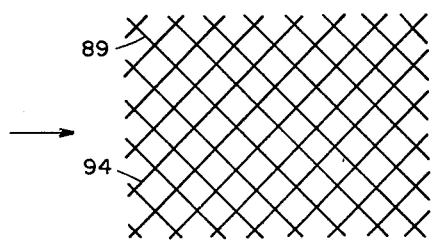
FIG. 15 is a plan view illustrating a portion of two-layer diagonal fabric formed by bonding together two network structures having their main filaments formed at equal opposite angles to the machine direction and desirably, but not necessarily, perpendicular to each other.

If the central network layer 91 shown in FIG. 13 is eliminated, a two-layer fabric such as shown in FIG. 15 is provided having the main filaments 89 on one layer 88 extending at an angle, such as 45° to the machine direction, and the second layer 93 having main filaments 94 extending oppositely at an equal angle to the machine direction. If the main filaments 89 and 94 are formed 45° to the machine direction then main filaments 94 will be perpendicular to the main filaments 89. Such a network structure with the central layer 91 eliminated has stretch and recovery properties in the machine and cross-directions similar to those of a knitted fabric. That is, the fabric will stretch both in the machine and cross-machine direction.

Figure 16:
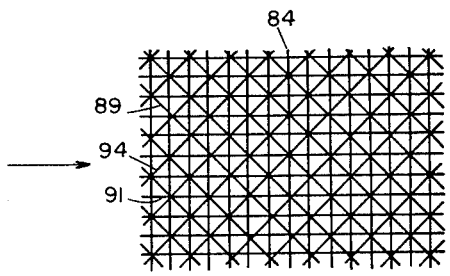
FIG. 16 is a plan view illustrating a portion of a four-layer isometric fabric made by bonding together in any desired order the two layers shown in FIG. 12 and the two layers shown in FIG. 15.

If desired, the three-layer structure of FIG. 13 could be made into a four-layer isometric fabric structure by bonding or laminating as a top layer, a network structure such as 83 shown in FIG. 12 which has main filaments 84 extending in the cross-machine direction. Such a four layer isometric fabric is shown in FIG. 16. For the most uniform properties in such a fabric, it is preferred that the main filaments 89 and 94 be formed at 45° angles to the machine direction. This fabric is dimensionally stable and has substantially no stretch in any direction.

Figure 17:
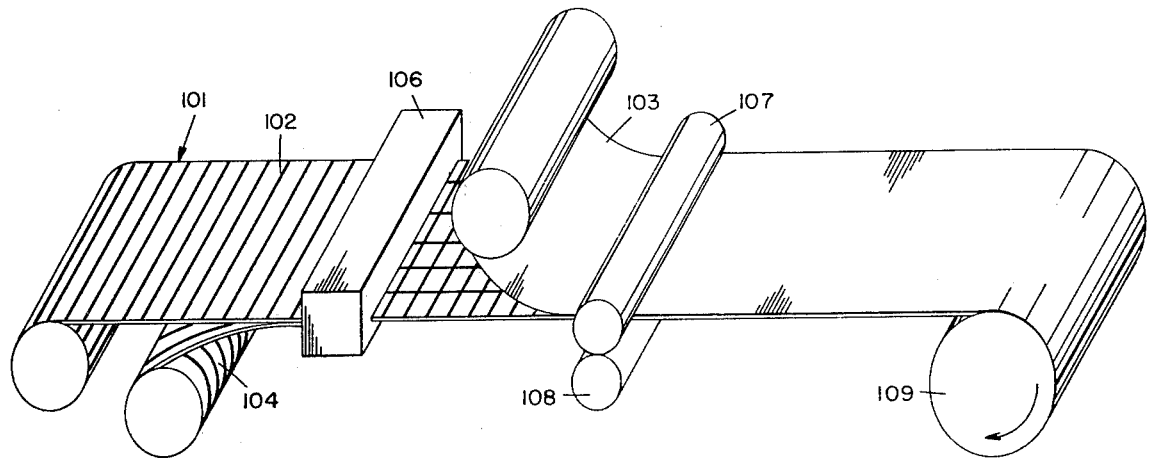
FIG. 17 is a perspective view illustrating apparatus for reinforcing paper, foil, nonwoven fabrics or films by utilizing a central network structure made in accordance with the principles of this invention.

Referring to FIG. 17, a single layer plastic network structure, generally designated at 101, having its main filaments 102 formed in the cross-machine direction is bonded between two layers 103 and 104 of paper, film, foil or nonwoven web such as carded, garnetted or air laid fiber webs, or any combinations thereof by first passing the network structure 101 and the layer 104 through an adhesive applicator 106. Then layer 103 is bonded to the other two layers by curing the adhesive as by passing them through a heated zone such as calender rolls 107 and 108, after which the reinforced paper, nonwoven fiber webs, film or foil structure is taken up on take-up spool 109.

It can be appreciated that many different multi-layer fabrics can be prepared in accordance with the principles of this invention by taking one network structure having main filaments in one direction and bonding thereto one or more other networks having main filaments in different directions. Then the layers may be bonded together into a fabric in many ways including applying or spraying an adhesive between the layers and passing them through an oven and calender rolls to bond the layers together, or by passing the layers only through a pair of heated calender rolls to heat bond them together, or by using ultrasonic bonding, or spot bonding or any other known conventional bonding technique.

Among the many uses of the subject network structures, either as single or multi-layer fabrics, are in sanitary napkins, diapers, incontinence pads, tampons, surgical dressings, surgical sponges, burn dressings, and reinforcing material for paper and paper products, films and other nonwovens and woven fabrics. For example, a network may be used to reinforce masking tape or wallpaper, thereby contributing increased tensile strength and tear resistance properties. In the case of paper and staple fiber non-wovens, the network structures of the type shown in FIG. 17 having main filaments in the cross-machine direction are particularly advantageous. This is because in preparing or making paper or staple fiber nonwovens the fibers therein customarily become oriented in the machine direction and increased strength in the cross-machine direction as well as increased tear resistance in the machine direction is needed. Additionally, the thermoplastic networks can be used as an adhesive in bonding other materials together under heat and pressure. They are also usable for fusible innerliners in shirts and the like, and can be used in place of cheesecloth for the manufacture and processing of cheeses.

The multi-layer fabrics described above are useful for applications similar to those described for the single layer network structures, and particularly useful for those applications in which balanced and high strength and tear resistant properties are desired. Multi-layer products are particularly useful, for example, for the preparation of high impact resistant plastic bags, primary and secondary tufted carpet backings, plastic coated fabrics, and for other industrial fabric applications. Many other uses are evident for these networks and fabrics which have such properties as not being absorbent, not sticking to wounds or other materials, readily passing liquids therethrough because of the openings in the network structures, and relatively light weight and high strength.

While emphasis has been placed on the high tensile strength and high tear resistance of the subject networks, it is of course apparent that network structures may be made in accordance with the principles of this invention without necessarily drawing the main filaments to a high degree so that network structures may have less strength and tear resistance for applications where those characteristics are not important. In certain applications, texture and smoothness may be more significant than strength. An example of such an application is the use of network structures as a covering in a sanitary napkin wherein it is highly desirable that the network have a soft and smooth texture in order to prevent irritation and also have high permeability to permit fluids to pass and be absorbed by the absorbent inner-material of the napkin.

The subject network structures are very smooth since they do not have any reinforced bosses or thick masses at the cross-over points of the main filaments and tie flaments. Such smoothness gives the network a soft hand or feel to make it desirable for many uses wherein irritation of the user or wearer may be an important factor. Additionally, the network structures can be drawn in such a manner as to provide relatively flat sturctures, that is, a structure having a relatively uniform thickness as measured in the plane perpendicular to the plane of the network. This may be significant for its use as an adhesive where it may be desired to bond two materials together to provide a laminated or bonded fabric having a uniform thickness.

Figure 18:
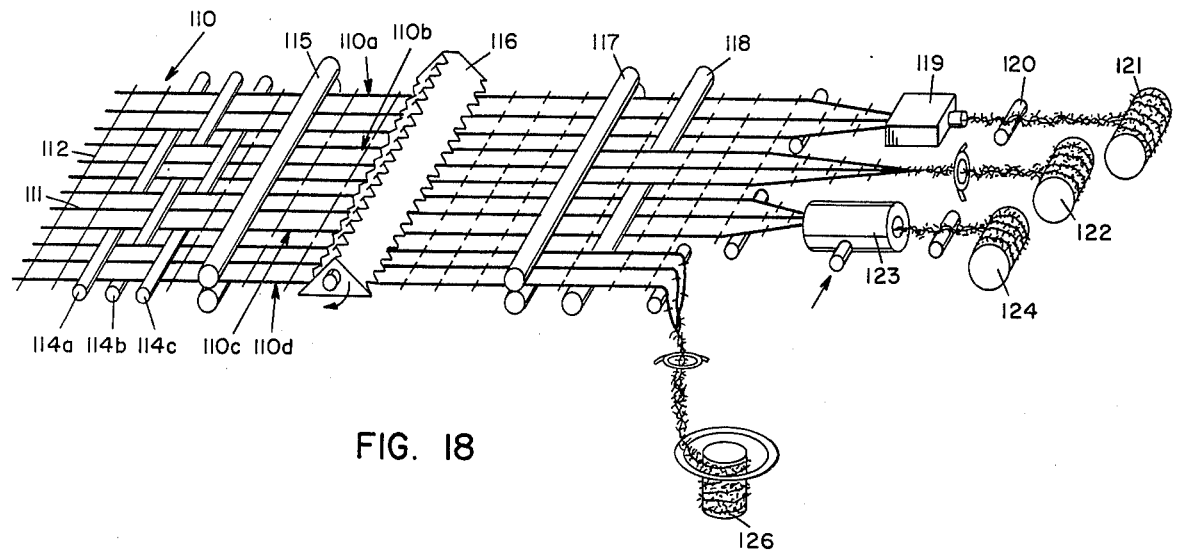
FIG. 18 is a view illustrating apparatus for making network structures into yarns.
Figure 19:
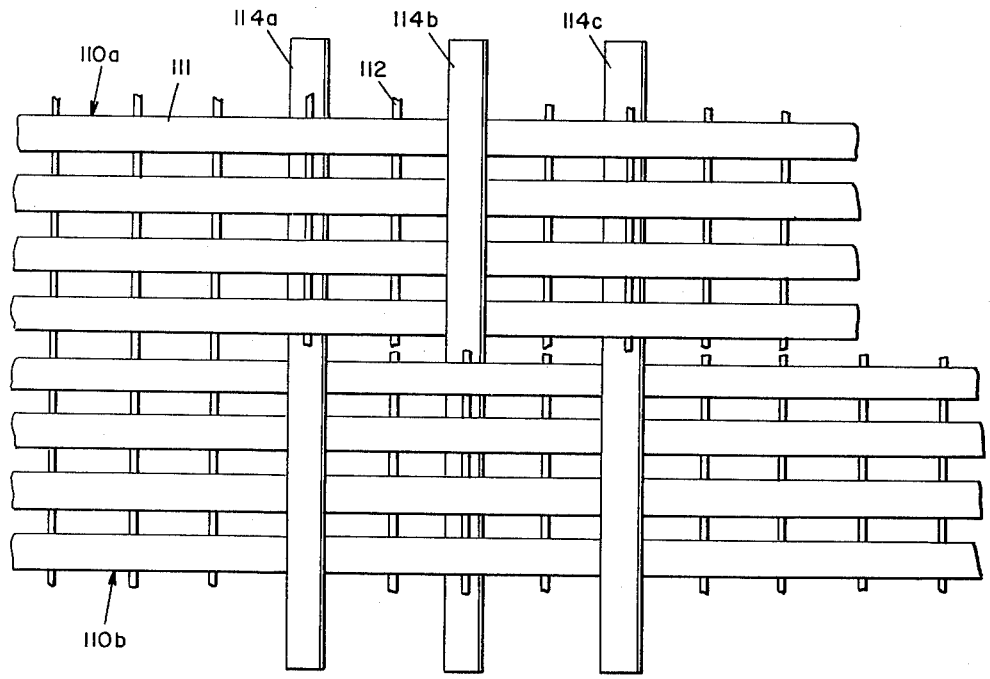
FIG. 19 is an enlarged view of the leasing rods of FIG. 18 used to separate or tear the network structure into strips.
Figure 20:
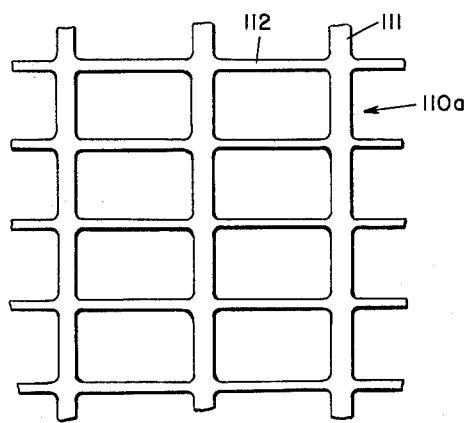
FIG. 20 is an enlarged plan view of a portion of a strip before fibrillation.
Figure 21:
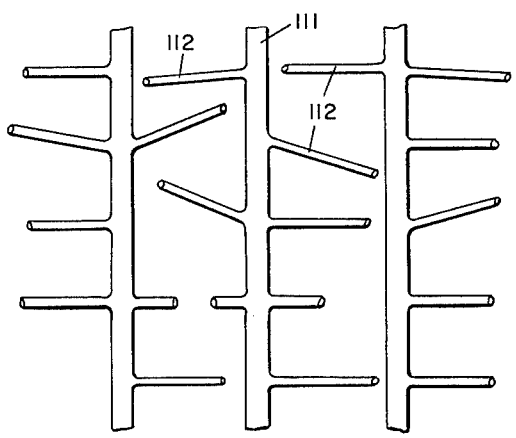
FIG. 21 is an enlarged plan view of the strip of FIG. 20 after fibrillation illustrating the broken tie filaments.
Figure 22:
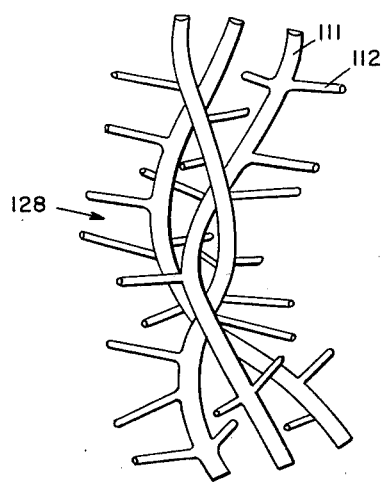
FIG. 22 is a view of a portion of an air jet interlaced multi-filament yarn having protruding side fibers.
Figure 23:
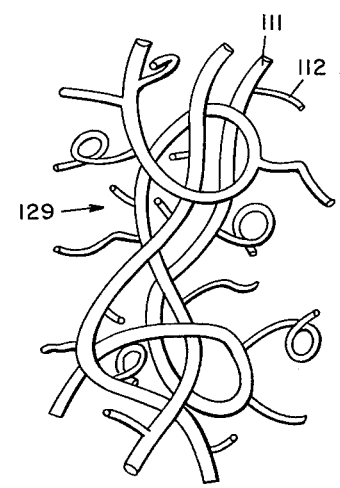
FIG. 23 is a view of a portion of a bulked entangled multi-filament yarn.

It is also possible to make novel monofilaments or yarns from certain of the network structure described above. Referring to FIG. 13, there is shown a network structure generally designated as 110 having main filaments 111 extending in the longitudinal or maching direction and tie filaments 112 extending in the cross-machine direction 90° to the main filaments 111. Any network structure having its main filaments formed in the machine direction and its tie filaments formed at an angle to the machine direction may be utilized in making monofilaments or yarns. The network 110 is advanced by nip rolls 115 through a plurality of lease rods generally designated as 114 to split the network structures into monofilaments or relatively narrow tapes or strips 110a, 110b, 110c, 110d, etc., consisting of single main filaments or a number of main filaments interconnected by tie filaments. The network 110 can easily be split into monofilaments or tapes of any desired width. This is accomplished by initially cutting or tearing the leading end of the network 110 into strips of the desired width and feeding adjacent strips differently through the lease rods 114 so that upon advancement the lease rods tear or split the network as desired. For example, as shown in FIGS. 18 and 19, strip 110a is fed over lease rod 114a, under lease rod 114b, and over lease rod 114c. The adjacent strip 110b is fed or passes under lease 114a, over lease rod 114b, and under lease rod 114c. Thus, as strips 110a and 110b advance, the lease rods break the tie filaments interconnecting the adjacent strips. Because of the relative sizes of the main filaments to the tie filaments, the tie filaments break easily upon passing through the lease rods as shown, without need for any cutting or slitting elements. If desired, the strips can then be fibrillated to completely or partially sever the tie filaments such as by passing the strip over a beater bar 116 similar to that described in U.S. Pat. No. 3,495,752. FIG. 20 shows a portion of strip 110a as it looks prior to fibrillation. Complete fibrillation of the network breaks substantially all of the tie filaments, leaving the main filaments intact thereby forming each strip into a yarn consisting of a plurality of individual main filaments which are not interconnected and have protruding portions of tie filaments extending perpendicularly therefrom, or at some other angle if the tie filaments are initially formed at some other angle. FIG. 21 shows a portion of strip 110a after fibrillation with the tie filaments broken. The main filaments are pulled through another set of nip rolls 117 and then may pass over a yarn guide 118 for further processing. The fibrillation by use of a beater bar 116, or by any other means, converts the strips 110a, 110b, etc. either partially or completely into a series of mutifilaments each with protruding normally smaller side filaments attached. If desired, bulking may be effected by known crimping or false twist methods. Also, bulking may be effected by heat relaxation if the main filaments have been prepared from bicomponent polymer sheets. For example, referring again to FIG. 18, the fibrillated strips 110a may be passed from the yarn guide 118 into a heater 119 to provide bulking. If desired, a false twist may be put into the yarns by use of false twisting head 120 after which the yarns are wound on a take-up spool 121. Alternatively, if zero twist yarns are desired, the unfibrillated or fibrillated strip 110b may be wound directly onto a take-up spool 122 as shown in FIG. 19. Alternatively, if desired, a fibrillated strip 110c may be passed through an air-jet interlacer 123 and then wound on a take-up spool 124. If further desired, the fibrillated strip 110d may pass through a conventional down twister 126 and then be wound on a take-up spool. Conventional air-jet entangling may be employed to convert the yarns to a form which can be wound and unwound from a package readily. FIG. 22 illustrates an air-jet entangled or interlaced yarn 128. FIG. 23 illustrates a bulked yarn 129 which is subsequently air-jet entangled. Twister take-up packages may also be used to form compact, readily handleable yarns. Of course, many combinations of these steps such as fibrillation followed by heat relaxation and twisting may be employed.

The unfibrillated strips or tape networks are also useful in untwisted form in weaving or knitting operations where maximum coverage in a light weight but strong fabric is desired. Such weaving or knitting operations can be carried out in line with the tape forming operation.

The yarns prepared in accordance with these techniques are unique in that the main filaments have protruding tie filaments which contribute bulk, cover and a desirable appearance. These yarns are useful for knitting, weaving, tufting and continuous filament nonwoven applications in general. The presence of the side tie filament portions provide improved adhesion of plastic, rubber or other coatings when fabrics prepared from these yarns are subsequently coated. Furthermore, because of the protruding side tie filament portions the yarns and fabrics have good abrasion and pilling resistance.

In the preceding discussion of the embossing methods, customarily one embossing roll drives the other embossing roll through the melt or sheet with each roll rotating at the same speed. However, when using polymers that are relatively difficult to split spontaneously, such as for example, polyesters, polyamides and vinyl polymers, differential speed embossing rolls can be used to effect incipient splitting of these polymers at the embossing stage. By differential speed, it is meant that the surface speed of the main rib embossing roll is different, from a slight differer up to about a 50% difference, either faster or slower, than the surface speed of the tie rib embossing roll. By using differential speed, of the main and tie rib embossing rolls it is possible to bring about splitting of the thin web areas of the embossed sheet at the embossing stage. This facilitates subsequent splitting or opening up into a uniform network structure upon draing.

The materials that the above network structures, fabrics and yarns can be formed from include any thermoplastic fiber-forming polymers. Among these are polyethylene, polypropylene homopolymer, random copolymers of propylene containing up to 10 percent of another olefin, block copolymers of propylene containing up to 25 percent of another olefin, nylon-6, nylon-66, polyethylene terephthalate, other high molecular weight thermoplastic polyesters, and vinyl polymers such as polyvinyl chloride. Conjugate or bicomponent plastic sheets in which two or more different polymers are extruded together to form sheets containing layers of separate polymers are also possible. Particularly desirable are conjugate plastic in which a higher melting component, such as nylon or polyester, is used to form the main portion of the main fibers. For example, two layers of network structures, each having a portion thereof made of a relatively high melting point polymer with the remaining portion being made of a lower melting point polymer, may be bonded together by placing the lower melting point polymers of each layer together and heating. Alternatively, a network structure made of a higher melting point polymer may be bonded to a network structure made of a lower melting point polymer. Furthermore, a network structure having a portion thereof made of a relatively high melting point polymer, may be bonded to another network structure being made only of a higher melting point polymer. Particularly desirable are conjugate plastic in which a higher melting point component, such as nylon or polyester, is used to form the main portion of the main fibers. This permits lamination without adhesive of two layers by bonding with heat and pressure or self-bulking by heating the yarns or fabrics prepared from them. Alloys or mixtures of polymers may also be employed.

The principles of this invention are exemplified by the following examples, which are given to illustrate the invention, and are not to be considered limiting in any way.

EXAMPLE 1

Polypropylene and high density polyethylene, each with a melt flow index of 10 were coextruded at 199° C. through a slit die 12 inches long with an opening 15 mils wide. The molten sheet consisting of 75% polypropylene on one side and 25% polyethylene on the other side was passed between two chrome-plated steel embossing rolls. One roll was 4 inches in diameter, the other 3 inches in diameter, each being 13 inches long. The 4 inch roll had an embossed pattern consisting of a plurality of grooves extending circumferentially around the roll with a spacing of 48 grooves per inch. This roll was internally cooled to maintain its temperature at 76° C. The other 3 inch roll had a pattern of straight grooves parallel to the axis of the roll having a uniform spacing of 111 grooves per inch. This 3 inch roll was controlled at 60° C. The molten sheet contacted the 4 inch roll one inch before entering the nip between the rolls, the polypropylene side of the molten sheet contacting this roll. The linear rate of the sheet was 19 feet per minute, and the embossed sheet went around the 4 inch roll with 180° contact. The embossed sheet contained 48 main ribs per inch in the longitudinal direction on one side with the ribs being separated by grooves 10 mils wide.

On the other side of the sheet the tie ribs were discontinuous with 111 tie ribs per inch with the tie ribs being separated by grooves 5 mils wide. The tie ribs were discontinuous, not being present in the areas opposite the main ribs on the other side of the sheet. The ratio of the cross-sections of the main ribs to the cross-sections of the tie ribs was about 2:1, and the ratio of the height of the main ribs to the thickness of the webs between the main ribs was about 5:1. The maximum thickness of the embossed sheet was 11 mils.

The embossed sheet was fed into a tenter heated with circulating air to 110° C. at a speed of 20 feet per minute and it was stretched to twice its width. In this operation, it opened into a uniform network structure. The sheet was then drawn in the linear direction by passing it in frictional contact with a series of 11 steel rolls heated to 120° C. and moving at progressively increasing speeds. The sheet was fed in at 15 feet per minute and exited at 105 feet per minute, so was drawn even times its length in the machine direction. The resulting network structure had a weight of 0.27 ounces per square yard. The uniformly oriented main filaments were about 40 denier in size. This network structure had a tensile strength of 11 pounds per inch and an elongation of 10 percent in the machine direction. The strength in the cross-direction was about 1.0 pounds per inch and the elongation 10 percent. The net was very resistant to tearing in the cross-machine direction, giving a value of 32 pounds when tested by the Finch edge tear method, ASTM D-827.

EXAMPLE 2

Polypropylene and high density polyethylene each with a melt flow of about 10 were coextruded at 207° C. into a conjugate sheet at a 50:50 bicomponent ratio using the extrusion equipment described in Example 1. The molten sheet was embossed between two rolls, one 6 inches in diameter, containing 75 grooves per inch parallel to the roll axis. The other roll was 4 inches in diameter and had 75 grooves per inch extending circumferentially around the roll. The 4 inch diameter roll was internally cooled to maintain its temperature at 60° C. and the 6 inch diameter roll was maintained at 49° C. The pressure between the two rolls was about 40 pounds per linear inch. The molten sheet contacted the 4 inch roll ½ inch ahead of the nip between the rolls. The sheet passed between the two rolls at a rate of 20 feet per minute. The embossed sheet had a maximum thickness of 9 mils and contained 75 main ribs per inch in the longitudinal direction on one side with the ribs being separated by grooves 5 mils wide. On the other side of the sheet discontinuous tie ribs were formed with 75 tie ribs per inch with each pair of tie ribs being separated by grooves 5 mils wide. The ratio of the cross-sections of the main ribs to the tie ribs was about 1:1 and the ratio of the height of the main ribs to the thickness of the webs between the main ribs was about 5:1. The tie ribs were not present in the areas opposite the main ribs on the other side of the sheet.

The embossed sheet was fed into a tenter heated with circulating air to 110° C. at a speed of 20 feet per minute and it was stretched to six times its width. In this operation, it opened into a uniform network structure, the sheet was then drawn in the linear direction by passing it in fritional contact with a series of 11 steel rolls heated to 120° C. and moving at progressively increasing speeds. The sheet was fed in at 15 feet per minute and exited at 90 feet per minute, thus was drawn six times its length in the machine direction. The resulting network structure had a weight of 0.2 ounce per square yard. The uniformly oriented main filaments were about 40 denier in size. This network structure had a tensile strength of 9 pounds per inch and an elongation of 14 percent in the machine direction. The strength in the cross-direction was about 7 pounds per inch and the elongation 12 percent. The net was very resistant to tearing in the cross-machine direction, giving a value of 20 pounds when tested by the Finch edge tear method, ASTM D-827.

EXAMPLE 3

High density polyethylene with a melt index of 6 was extruded at 232° C. through a slit die 18 inches long. The molten sheet was embossed between two rolls, one 6 inches in diameter containing 250 grooves per inch extending 45° to the roll's axis and the other 4 inches in diameter having 75 grooves per inch extending in the circumferential direction. Both rolls were maintained at a temperature of 66° C. The molten sheet contacted the 4 inch roll ¼ inch from the nip between the rolls. The linear rate of the sheet passing between the embossing rolls was 20 feet per minute and the embossed sheet went around the 4 inch roll with 90° contact. The embossed sheet contained 75 ribs per inch in the machine direction with the ribs being separated by grooves 5 mils wide. On the other side of the sheet discontinuous tie ribs were formed with 250 ribs per inch with the ribs being separated by grooves 1 mil wide. The tie ribs were not present in the areas opposite the main ribs on the other side of the sheet. The ratio of the cross-sections of the main ribs to those of the discontinuous tie ribs was about 10:1, and the ratio of the height of the main ribs to the thickness of the webs between the main ribs was 4:1. The maximum thickness of the embossed sheet was 4 mils.

The embossed sheet was stretched three times its length on linear draw rolls at 120° C., and then was stretched 2.5 times its width in a tenter at 90° C. during which operation regular voids or openings were formed between the main filaments. The sheet was then drawn linearly 1.5 times its length by passing it over a series of differential speed rolls heated to 120° C. The weight of the network structure so formed was 0.25 ounce per square yard. The uniformly oriented main filaments were about 40 denier in size. This network structure had a tensile strength of 3.9 pounds per inch in the machine direction and an elongation of 13 percent. The strength in the cross-machine direction was 0.5 pound per inch and the elongation was 26 percent. The net had high tear resistance in the cross-machine direction.

EXAMPLE 4

Polypropylene with a melt flow index of 7 was extruded at 250° C. through a slit die 12 inches long with an opening 20 mils wide. The molten sheet was passed into the nip between two embossing rolls maintained at 70° C. One roll was 4 inches in diameter and contained 40 grooves per inch extending circumferential around the roll separated by 5 inch wide ridges. The other roll was 6 inches in diameter and contained 125 discontinuous grooves per inch parallel to the roll axis. The discontinuous parallel grooves were 7 mils long with 18 mil discontinuities between the grooves. The discontinuities were in lines extending circumferentially around the roll. The rolls were aligned so that the lines of discontinuity on the 6 inch roll were directly opposite the grooves on the 4 inch roll. The linear speed of the sheet was 25 feet per minute and the embossed sheet was maintained in contact with the 6 inch roll over an angle of 90°. The embossed sheet contained 40 ribs per inch on one side separated by webs 5 mils wide. On the other side of the sheet were discontinuous tie ribs with a spacing of 125 ribs per inch. The tie ribs were not present in the areas opposite the main ribs on the other side of the embossed sheet. The ratio of the cross-sections of the main ribs to the cross-sections of the tie ribs was about 20:1 and the ratio of the height of the main ribs to the thickness of the webs between the main ribs was 10:1. The maximum thickness of the embossed sheet was 15 mils.

The embossed sheet was oriented in the machine direction by passing it in frictional contact with a series of 11 steel rolls heated to 120° and moving at progressively higher speeds. The sheet was fed in at 15 feet per minute and exited at 150 feet per minute, so was drawn ten times its original length. The sheet separated into a network structure with a weight of 0.5 ounces per square yard. The machine direction filaments were about 80 denier in size separated about 3 mils. the strength in the machine direction was about 20 pounds per inch with 15 percent elongation. The net had high resistance to tearing in the cross-machine direction, being about 60 pounds when tested by the Finch edge tear method.

It is to be understood that the above described embodiments are merely illustrative of applications of the principles of this invention and that numerous other arrangements and modifications may be made within the spirit and scope of the invention.

What we claim and desire to protect by Letters Patent is:

1. A yarn comprising at least one main filament uniaxially oriented along its longitudinal axis and having protruding therefrom along its length a plurality of portions of tie filaments which have no substantial portion thereof crossing over the main filament, each of said portions of tie filaments protruding from said main filament being substantially perpendicular to said main filament at the junction between each of said portions of tie filaments and said main filament and each of said portions of tie filaments having its longitudinal axis in axial alignment with the longitudinal axis of the corresponding portion of tie filament protruding from the other side of said main filament at the junction between each of said portions of tie filaments and said main filament.

2. A woven fabric composed of the yarn set forth in claim 1.

3. A knit fabric composed of the yarn set forth in claim 1.

* * * * *

UNITED STATES PATENT AND TRADEMARK OFFICE
CERTIFICATE OF CORRECTION

PATENT NO. : 4,274,251
DATED : June 23, 1981
INVENTOR(S) : Charles W. Kim et al

It is certified that error appears in the above-identified patent and that said Letters Patent are hereby corrected as shown below:

Col. 1, line 62 " in " should read -- a -- ;

Col. 1, lines 65 & 66 "induced" should read -- reduced --;

Col. 5, line 12 " extruded " should read -- embossed --;

Col. 6, line 18 " orientatin " should read -- orientation --;

Col. 6, line 18 " not " should read -- net -- ;

Col. 6, line 21 "axes. " should read -- axes, -- ;

Col. 8, line 4 " ever " should read -- over -- ;

Col. 8, line 13 "72" should read --71-- ;

Col. 8, line 40 " top " should be omitted ;

Col. 8, line 46 " stop " should read -- step -- ;

UNITED STATES PATENT AND TRADEMARK OFFICE
CERTIFICATE OF CORRECTION

PATENT NO. : 4,274,251

DATED : June 23, 1981

INVENTOR(S) : Charles W. Kim et al

Figure 8:
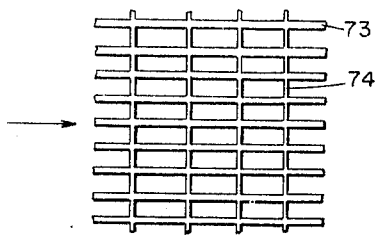
FIG. 8 is a plan view illustrating a portion of a network structure having main filaments in the machine direction and tie filaments in the cross-machine direction.

It is certified that error appears in the above-identified patent and that said Letters Patent are hereby corrected as shown below:

Col. 9, line 4  " FIG. 3, " should read -- FIG. 8, -- ;

Col. 9, line 16  " so " should be inserted before -- they -- ;

Col. 9, line 63  " rolls 70 " should read -- rolls 79 -- ;

Col. 14, line 4  --draing-- should read --draining--;

Col. 15, line 65  "fritional" should read -- frictional -- .

Signed and Sealed this

Twenty-second Day of September 1981

[SEAL]

Attest:

GERALD J. MOSSINGHOFF

Attesting Officer

Commissioner of Patents and Trademarks